United States Patent
Kelsey

[15] 3,658,469

[45] Apr. 25, 1972

[54] CONTINUOUS PRODUCTION OF ALUMINA WHISKERS

[72] Inventor: Robert H. Kelsey, 8 Ticonderoga Road, West Acton, Mass.

[22] Filed: Oct. 16, 1969

[21] Appl. No.: 867,056

Related U.S. Application Data

[63] Continuation-in-part of Ser. No. 620,746, Mar. 6, 1967, abandoned.

[52] U.S. Cl. ..................................................23/142, 106/65
[51] Int. Cl. ..................................................C01s 7/30
[58] Field of Search ........................23/142, 143, 305; 106/65

[56] References Cited

UNITED STATES PATENTS

| | | | |
|---|---|---|---|
| 3,011,870 | 12/1961 | Webb et al. | 23/142 |
| 3,077,380 | 2/1963 | Wainer et al. | 106/65 X |
| 3,147,085 | 9/1964 | Gatti | 23/142 X |
| 3,341,285 | 9/1967 | Kelsey | 23/142 |
| 3,421,851 | 1/1969 | Shyne et al. | 23/142 |

OTHER PUBLICATIONS

G. T. Lynch et al. Growth and Analysis of Alumina Whiskers Air Force Systems Command, 1962, pages 5– 7.

Primary Examiner—Oscar R. Vertiz
Assistant Examiner—G. O. Peters
Attorney—Richard H. Childress, Robert F. Meyer, Henry W. Cummings and C. Carter Ells, Jr.

[57] ABSTRACT

A method and apparatus for making single crystal alpha-alumina in the form of whiskers of width and thickness generally of 0.100–100 microns. Whiskers are grown in a continuous process within the apparatus described which utilizes oxygen and hydrogen in the reaction zone for the transformation.

8 Claims, 4 Drawing Figures

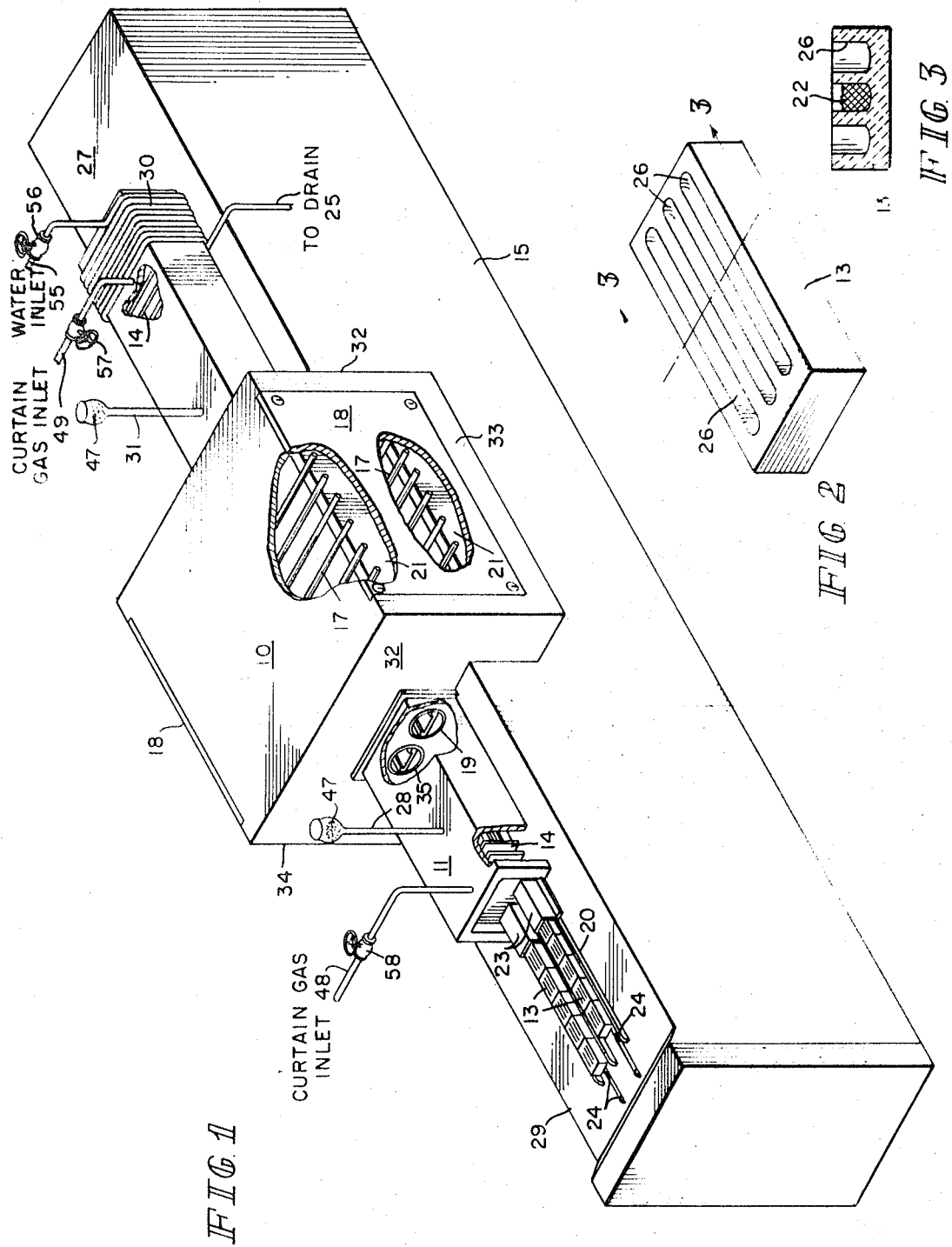

Patented April 25, 1972

INVENTOR
ROBERT H. KELSEY
BY Henry W. Cummings
ATTORNEY

CONTINUOUS PRODUCTION OF ALUMINA WHISKERS

This application is a continuation-in-part of application Ser. No. 620,746 filed Mar. 6, 1967, now abandoned The present invention relates to means of producing single crystals of aluminum oxide and, more particularly, to continuous means of producing single crystal whiskers of alpha-alumina characterized by a nearly perfect crystalline structure.

Certain small crystals, of various metals and compounds, exhibiting unusually high strength have been discovered and/or produced. The excellent mechanical properties of these filamentary-type crystals are generally attributed to a lack of structural defects such as dislocations and stacking faults which are usually present in ordinary bulk crystals. Such crystal defects prevent metals and compounds from exhibiting the strength they theoretically should possess--the strength required to separate or shear perfect crystal layers from one another. It has been hypothesized that if a crystal free of structural defects could be produced, it would possess much higher strength than is observed for that substance in bulk form. The aforementioned nearly perfect crystals approach this hypothetical strength and, therefore, should find many uses in industry as reinforcing additives in spring materials, high-temperature members and miniature assemblies, and other applications where a high ratio of strength to weight is essential, or where conventional materials are inadequate.

Crystals of this type are usually formed or grown by controlled deposition from the vapor state. A number of substances have been crystallized into nearly perfect structures such as iron, copper, silver, cobalt, zinc, silicon nitride, titanium nitride, zinc oxide and boron carbide.

Needle-like, high-strength, almost perfect crystals of several substances have potential applications as additives, and the composites thus formed can be expected to exhibit superior strength or strength-to-weight properties. However, there are relatively few such crystals known in the art; the one most discussed in the literature being alpha-aluminum oxide which appears to be an excellent potential reinforcing material and approaches a tensile strength of 3 million psi.

Furthermore, it maintains its strength at temperatures in excess of 1,000° C.

Presently, whiskers are being produced by experimental techniques which are not particularly suitable for large scale, economical production. Nor are there any methods known in the art which can be used to produce almost perfect alpha-aluminum oxide single crystals which are strong, inexpensive and of high yield. The present invention provides an advance over the art by revealing how the aforementioned requirements may be met.

Therefore, it is an object of the present invention to provide a method of producing practically perfect whiskers of alpha-aluminum oxide in the form of ribbons having thickness and widths on the order of 0.1-100 microns.

It is also an object of the present invention to provide an improved method of preparing alpha-aluminum oxide in whisker form.

It is still another object of this invention to convert aluminum into a maximum quantity of sapphire whiskers during a process time of not more than about 7-10 minutes.

Another object of this invention is to provide a method of producing sapphire crystals in ribbon form rather than a mixture of platelets, tubes, ribbons and rods intermixed.

It is another object of the present invention to provide a method of producing large quantities of alpha-aluminum oxide whiskers which have high tensile strength and can be used to reinforce a number of materials for high-temperature, high-stress applications.

The present invention, in another of its aspects, relates to novel features of the instrumentalities described herein for teaching the principal object of the invention and to the novel principles employed in the instrumentalities whether or not these features and principles may be used in the said object or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

In general, the process which satisfies the objects of the present invention comprises the steps of converting an aluminum source material to aluminum in the vapor phase in an atmosphere of hydrogen and water vapor at a temperature of about 300° to 2,000° C. preferable 1,400° to 1,500° C. It has been theorized that during the vapor phase, A10 and $Al_2O$ disproportionate into $Al_2O_3$ which is deposited on a nearby nucleating surface. These deposits are in the form of whiskers of single crystal sapphire.

Peruse the accompanying drawings in which:

FIG. 1 is an isometric view of whisker-growing apparatus which may be used in the present invention.

FIG. 2 is an isometric view of nucleating boats which may be used in the present invention.

FIG. 3 is a section of the nucleating boat with a charge in place.

Figure 4:
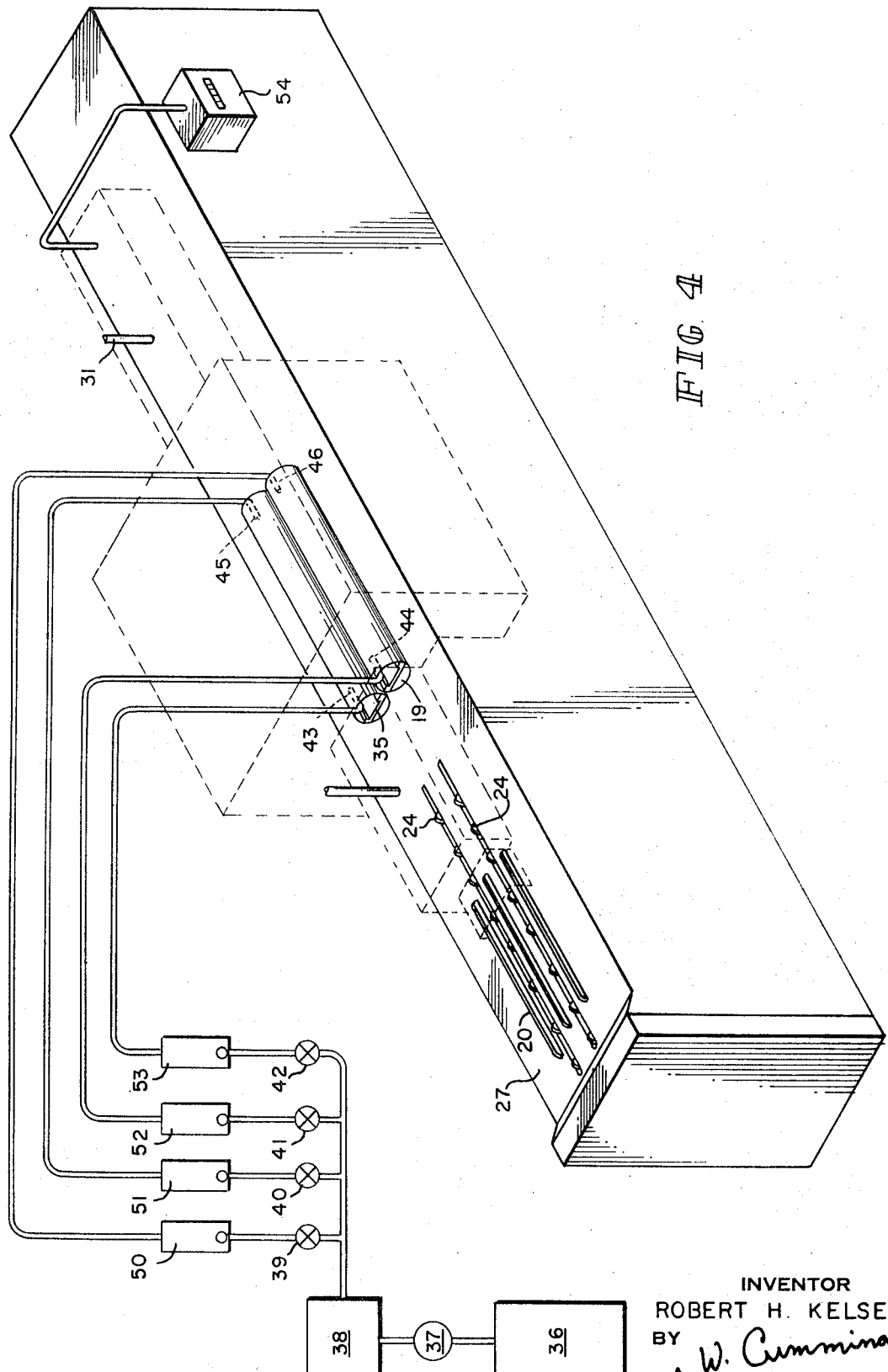
FIG. 4 is a skeletal isometric view of an apparatus which may be used in the present invention.

The present invention is described herein in one of its embodiments which is intended to be illustrative and not exhaustive in scope since many different embodiments of the invention may be made without departing from the essence thereof.

Referring to FIGS. 1 and 4, it can be seen that the whisker-producing apparatus includes a high-temperature furnace 10 provided with a refractory lining 21 and with two cylindrical muffles 19 made of for example silicon carbide passing through and extending slightly beyond the side walls 32. Heating elements 17 in the form of refractory resistance rods are located above and below the muffle 19 and are held loosely in place in holes extending through the refractory lining 21. Heating may also be done by the use of radio frequency power operating into conventional soil and susceptor arrangements. The heating elements 17 are preferably connected into three groups, each group controlled independently for example by an industrial type SCR or other conventional controlling mechanism. The middle group of heating elements 17 may be controlled by a proportional-controller for automatic adjustment of the middle zone. The two end zones may be controlled by the center zone setting, by known master-slave arrangement.

An input vestibule 11 of refractory material is sealed to one end of the muffle 19 and a similar output vestibule 12 is sealed to the other end of the muffle 19. Gas curtains 14 of non-corroding material such as stainless steel are located at the open ends of each vestibule 11-12 to control atmospheric condition within the furnace including the extent of diffusion of oxygen into the reaction chamber. The gas (nitrogen) curtains 14 are comprised of a group of non-corrosive baffles closing off most of each end of the vestibules 11-12 but leaving openings for the passage of refractory boats 13, side by side. The vestibule adapter 23 partially closes the vestibule opening when a boat is inserted into the adaptor. Inert curtain gas such as nitrogen, argon, helium, etc. 48-49 for each curtain is fed into the system at a rate appropriate for the particular installation being utilized. The rate is often from about 10 to 100 standard cubic feet per hour and is regulated by means of appropriate valves such as 57-58.

The equilibrium concentration of water vapor in the reaction zone depends on the size of the openings through which oxygen and water vapor is diffusing into the furnace and the rate at which the inert gas flow carries them out of the furnace. If the inert gas flow is high, most of the oxygen and water vapor will be carried out with it and the water vapor concentration inside the reaction zone will be small. The inert gas flow rate must be selected to produce the water vapor concentration most favorable for this process. In general a water vapor concentration corresponding to a partial pressure of about 0.1 to 10 torr may be used, preferably 3 to 4 torr is used.

The boats 13 are moved through the furnace by appropriate means such as guide rails 20 and driving cog 24 abuts the trailing end of the boat and pushes the boats into the input vestibule 11. If desired, driving cogs 24 for each set of guide rails 20 may be provided so that two columns of boats may be pushed through the furnace 10 at the same time. The driving cogs 24 may be spaced apart slightly more than a boat's length on the periphery of a chain mounted below the table-top 29 and protruding above the table-top 29. The rate of movement of the boats should be such that they remain in the reaction zone for at least about 5 minutes to several hours, preferably at least about 7 minutes to 10 minutes. The rate may be adjusted by the speed-control provided.

The cover gas 36 (hydrogen) is regulated by appropriate valves such as 39–40–41–42. If desired the rate of flow may be shown on the flowmeter scale 50–51–52–53.

An input thistle tube 28 with the bulb filled with ceramic beads 47 may be utilized to allow excess hydrogen, inert gas and water vapor to be exhausted from the furnace.

Access panels 18 may be installed to facilitate removal of the heating elements and permit changes in connections to vary the heating zones.

The output portion of the machine is very much the same as the input. The output of the muffle 19 is sealed to the vestibule 12, the open end of which is fitted with cooling means such as a cooling coil 30 supplied with cooling fluid such as cold water 55 passing through a control valve 56. The waste water is discharged to the drain 25.

Thistle tube 31 serves the same purpose as thistle tube 28. If either the input or output thistle tube flame is extinguished, the cover gas supply 36 is automatically turned off.

A table-top 27 or other appropriate means is provided abutting the output vestibule 12 so that the boats 13 may be cooled off and the whiskers thereon and therein removed.

FIG. 2 illustrates one type of boat 13 which may be used in the present invention. This boat 13 is composed of refractory material such as high alumina fire brick, and has at least one longitudinal groove 26 which serves the dual purpose of acting as a vessel to contain the charge and also as a receptable for the whiskers during nucleation. A plurality of grooves may be provided as desired for increased production rates.

FIG. 3 is a cross-section 3—3 of a boat 13 which shows the nature of the grooves 26 and location of the charge 22.

FIG. 4 depicts exemplary cover gas piping and other features.

No attempt has been made to describe, in minutiae, the electrical circuits, gas control devices, temperature control, etc., as such peripheral knowledge is possessed by those familiar with the art.

One method for operating this apparatus is as follows:

Turn control valve 56 so that cooling fluid water from water inlet 55 flows through the cooling coil 30 and finally down the drain 25, Connect the furnace 10 to the power source and set the temperature controller to the desired operating temperature, and Allow the furnace 10 to operate until the furnace temperature becomes substantially constant.

Place boats or other obstructions in input and output adapters 23 to control back-diffusion and purge furnace 10 of air by admitting inert gas through curtains 48–49 and muffle 19 at a rate appropriate for the particular standard cubic feet per hour. To prevent explosion, hydrogen must not be introduced into the furnace until the oxygen content of the furnace is less than 4 percent.

In practice the oxygen content of the vestibules 11–12 is held at about 0.5 percent or less may be varied by adjusting the flow rate of the inert gas. An oxygen meter 54 indicates directly the percentage of oxygen in the vestibule 12. Depending upon the amount of oxygen introduced through vestibules 11 and 12, hydrogen having a dew point corresponding to the amount of additional oxygen desired is introduced through the ports 43–46. Tables of dew point and water vapor content are available; for example −30° C. corresponds to 0.28 torr. The rate into each inlet tube is dependent upon the particular installation.

Boats 13 are then charged with powdered aluminum preferably 60 to 120 mesh in at least one groove 26.

As the charged boats move into the furnace 10, more are charged as desired and added to the train, ultimately emerging from the output end of the furnace where the whiskers generated by the reaction are harvested. The boats 13 may be returned to stock and reused.

In this fashion a continuous train of boats of effectively infinite length may be introduced into the heated zone where reaction takes place and removed from the zone in a continuous manner.

As the boats enter the furnace 10, there is a reaction between the hydrogen, water vapor, oxygen and vaporized aluminum. As the boats move through the reaction chamber, alpha-alumina ribbons are formed on nucleating surfaces of the boat.

Having thus described the instant invention, I claim:

1. In a method for making single crystals of aluminum oxide including:
    converting an aluminum source material to aluminum vapor in an atmosphere containing hydrogen and water vapor;
    reacting said aluminum with said atmosphere an elevated temperature in an atmosphere controlled furnance;
    depositing alumina upon a nucleating surface in the form of single crystal whiskers;
    the improvement comprising: providing a plurality of boats which contain metallic aluminum and which boats also provide nucleating units for a plurality of single crystal alumina whiskers;
    providing an atmosphere controlled furnace having an inlet vestibule, a reaction zone, and an outlet vestibule; passing the boats continuously through said inlet vestibule, reaction zone and outlet vestibule wherein said aluminum is vaporized and reacts with water vapor in said reaction zone to form alumina single crystal whiskers in said boats;
    introducing hydrogen having a dew point corresponding to the partial pressure of water vapor of about 0.1 to about 10 torr into said reaction zone; introducing inert gas into said inlet vestibule and said outlet vestibule sufficient to maintain said water vapor concentration in said reaction zone; whereby the aluminum provided in said boats is vaporized and alumina single crystal whiskers are continuously deposited upon boats passing through said reaction zone; and
    continuously removing alumina single crysral whiskers from said boats.

2. A method according to claim 1 in which hydrogen is not introduced until the oxygen content of the furnace is at least as low as 4 percent by volume.

3. A method according to claim 1, in which the process is completed in not more than about 10 minutes.

4. A method according to claim 1, in which said outlet vestibule is cooled.

5. A method according to claim 1 in which said gas inert is selected from the group consisting of nitrogen, helium, argon, and mixtures thereof.

6. A method according to claim 1 in which inert gas is introduced into said outlet vestibule at a rate sufficient to maintain the oxygen content not above about 0.5 percent in said outlet vestibule.

7. A method according to claim 6 in which inert gas is introduced into said inlet vestibule at a rate sufficient to maintain the oxygen content not above about 0.5 percent in said inlet vestibule.

8. A method according to claim 1, in which at least some water vapor and oxygen are obtained from the surrounding atmosphere.

* * * * *